United States Patent
Black et al.

(10) Patent No.: US 10,710,262 B2
(45) Date of Patent: Jul. 14, 2020

(54) TOOL AND METHOD FOR SEPARATING AND PICKING CUT PIECES OF FLEXIBLE MATERIALS

(71) Applicant: ARM AUTOMATION, INC., Austin, TX (US)

(72) Inventors: Derek D. Black, Austin, TX (US); Joseph W. Geisinger, Austin, TX (US); Stephen G. Grupinski, Austin, TX (US); William W. Wicker, Blanco, TX (US)

(73) Assignee: Arm Automation, Inc., Austin, TX (US)

( * ) Notice: Subject to any disclaimer, the term of this patent is extended or adjusted under 35 U.S.C. 154(b) by 153 days.

(21) Appl. No.: 15/371,118

(22) Filed: Dec. 6, 2016

(65) Prior Publication Data

US 2018/0154539 A1   Jun. 7, 2018

(51) Int. Cl.
*B26D 7/18* (2006.01)
*B26D 5/00* (2006.01)
(Continued)

(52) U.S. Cl.
CPC ........ *B26D 7/1863* (2013.01); *B25J 15/0014* (2013.01); *B25J 15/0616* (2013.01); *B26D 5/005* (2013.01); *B65H 5/14* (2013.01); *B65H 5/226* (2013.01); *B65H 29/243* (2013.01); *B65H 2301/4472* (2013.01); *B65H 2404/152* (2013.01); *B65H 2406/00* (2013.01);
(Continued)

(58) Field of Classification Search
CPC .... B26D 7/1863; B26D 5/005; B65H 29/243; B65H 2404/152; B65H 2406/331; B65H 2701/174; B65H 2701/131; B65H 5/226; B65H 23/4422; B65H 2406/3632; B65H 2404/1531; B65H 2301/4472; B65H 3/10; B65H 5/02; B65G 61/00; B65G 2701/175; B25J 15/0616
USPC ..... 83/152; 271/96, 104, 106, 31.1, 94, 149, 271/108, 5, 11–15, 121, 112; 156/265, 156/230, 250
See application file for complete search history.

(56) References Cited

U.S. PATENT DOCUMENTS 3,271,024 A * 9/1966 May ..................... G06K 13/107
  235/476
3,584,866 A * 6/1971 Ross ..................... B21D 43/24
  271/12
(Continued)

OTHER PUBLICATIONS

International Search Report and Written Opinion dated Feb. 15, 2018 for corresponding PCT/US2017/064118; 14 pages.
(Continued)

*Primary Examiner* — Ghassem Alie
(74) *Attorney, Agent, or Firm* — Larson Newman, LLP

(57) ABSTRACT

The disclosure relates to a method and apparatus that separates and efficiently captures from an automated cutting table select pieces of thin, flexible material in an orderly manner which prevents damage to the selected piece while preventing the undesired lifting or movement of the surrounding material. The apparatus comprises a pick head assembly including a cylinder with a plurality of orifices that communicates with the selected piece to maintain contact between the selected piece and the cylindrical surface while the selected piece is being removed.

10 Claims, 12 Drawing Sheets

(51) Int. Cl.
  *B65H 29/24* (2006.01)
  *B65H 5/14* (2006.01)
  *B25J 15/00* (2006.01)
  *B65H 5/22* (2006.01)
  *B25J 15/06* (2006.01)
(52) U.S. Cl.
  CPC ............... *B65H 2406/331* (2013.01); *B65H 2406/3632* (2013.01); *B65H 2701/131* (2013.01); *B65H 2701/174* (2013.01); *B65H 2701/175* (2013.01)

(56) References Cited

U.S. PATENT DOCUMENTS

| | | | | |
|---|---|---|---|---|
| 4,345,752 | A * | 8/1982 | Nakamura | B65H 3/10 271/104 |
| 4,739,982 | A * | 4/1988 | Hain | B65H 3/10 271/106 |
| 4,870,727 | A | 10/1989 | Ribolla et al. | |
| 5,496,021 | A | 3/1996 | Billio et al. | |
| 5,623,850 | A | 4/1997 | Szczepaniak et al. | |
| 6,446,955 | B1 * | 9/2002 | Janatka | B65H 3/10 271/104 |
| 6,773,006 | B2 * | 8/2004 | Andreyka | B65H 3/10 271/94 |
| 7,601,237 | B2 * | 10/2009 | Burgess | B29C 70/386 156/230 |
| 9,364,967 | B2 | 6/2016 | Fastert et al. | |
| 2004/0055521 | A1 | 3/2004 | Katou | |
| 2004/0142062 | A1 | 7/2004 | Herrera | |
| 2005/0029731 | A1 | 2/2005 | Chang | |
| 2006/0037693 | A1 | 2/2006 | Wade | |
| 2006/0261120 | A1 | 11/2006 | Slyne | |
| 2008/0073866 | A1 * | 3/2008 | Santos Gomez | B64F 5/50 280/79.11 |
| 2009/0289143 | A1 | 11/2009 | Tanaka et al. | |
| 2012/0227866 | A1 | 9/2012 | Barker | |
| 2017/0151097 | A1 * | 6/2017 | Schneider | A61F 13/15764 |
| 2017/0368706 | A1 | 12/2017 | Zund et al. | |

OTHER PUBLICATIONS

YouTube Video published Mar. 15, 2016 by AssysBullmerUK, "Cutting machine for composites for automated composites production at Cytec/Solvay Centre"; accessed on Nov. 28, 2017 from <<https://youtu.be/IERawuK-Mw>>; relevant information at 1:05/3:33 to 1:13/3:33 of video. 14 pages of screenshots attached.
PCT/US2019/066953, International Search Report dated Apr. 9, 2020, 7 pages.

* cited by examiner

US 10,710,262 B2

TOOL AND METHOD FOR SEPARATING AND PICKING CUT PIECES OF FLEXIBLE MATERIALS

BACKGROUND

Field of the Disclosure

The present disclosure relates to automated picking of pieces cut from flexible sheets of material and, in particular, to an improved method and apparatus for lifting select pieces of cut material from a flexible sheet positioned on a table.

Background of the Disclosure

The efficient removal of workpieces cut from flexible sheets of material has long been a challenge to manufacturers. Although human labor and intelligence provides flexibility in dealing with contingencies, manual picking is generally slow and inefficient, particularly in high-volume operations, and manual handling can also introduce damage, process errors, and related quality issues.

To address these issues, many manufacturers have turned to automated methods, such as robots, to selectively pick and handle various shaped pieces cut from sheets of material, and defined by cut lines. In order for robotic automation to selectively pick a specific piece of cut material from the surrounding sheet of material on the cutting table, some mechanism of selective coupling between a pick head and the specific workpiece must be provided. Various mechanisms for engaging a specific workpiece include individually controllable needle-and-hook type grippers and flat arrays of vacuum orifices. The use of needle-and-hook type grippers can have issues with engaging and releasing of material. The use of flat arrays requires the use of a large number of individually controllable vacuum orifices to ensure just a selected piece of material is engaged. An improved method and apparatus for automated picking thin materials would be beneficial.

BRIEF DESCRIPTION OF THE DRAWINGS

The present disclosure may be better understood, and its numerous features and advantages made apparent to those skilled in the art by referencing the accompanying drawings.

DETAILED DESCRIPTION OF THE DRAWINGS

The present disclosure describes an automated station having a pick head that provides for an improved approach to separate cut pieces from a flexible sheet of material placed upon a table. According to an embodiment, a cylinder of the pick head includes a lateral region of individually selectable vacuum orifices. The pick head is moved so that a portion of the individually selectable vacuum orifices are in contact with a leading edge of a cut piece of the flexible sheet. Similarly, a portion of the individually selectable vacuum orifices are in contact with a peripheral portion of the flexible sheet that is adjacent to the cut piece. A vacuum is enabled at those orifices that are in contact with a portion of the flexible sheet to hold a leading edge portion of the cut piece against the cylinder the cylinder. Conversely, no vacuum is enabled at those individually selectable vacuum orifices that are in contact with the peripheral portion of flexible sheet. Once the vacuum is applied to the desired individually selectable orifices, the cylinder is rolled over the flexible sheet while maintaining the vacuum so that the cut piece is wrapped onto the cylinder.

Figure 1:
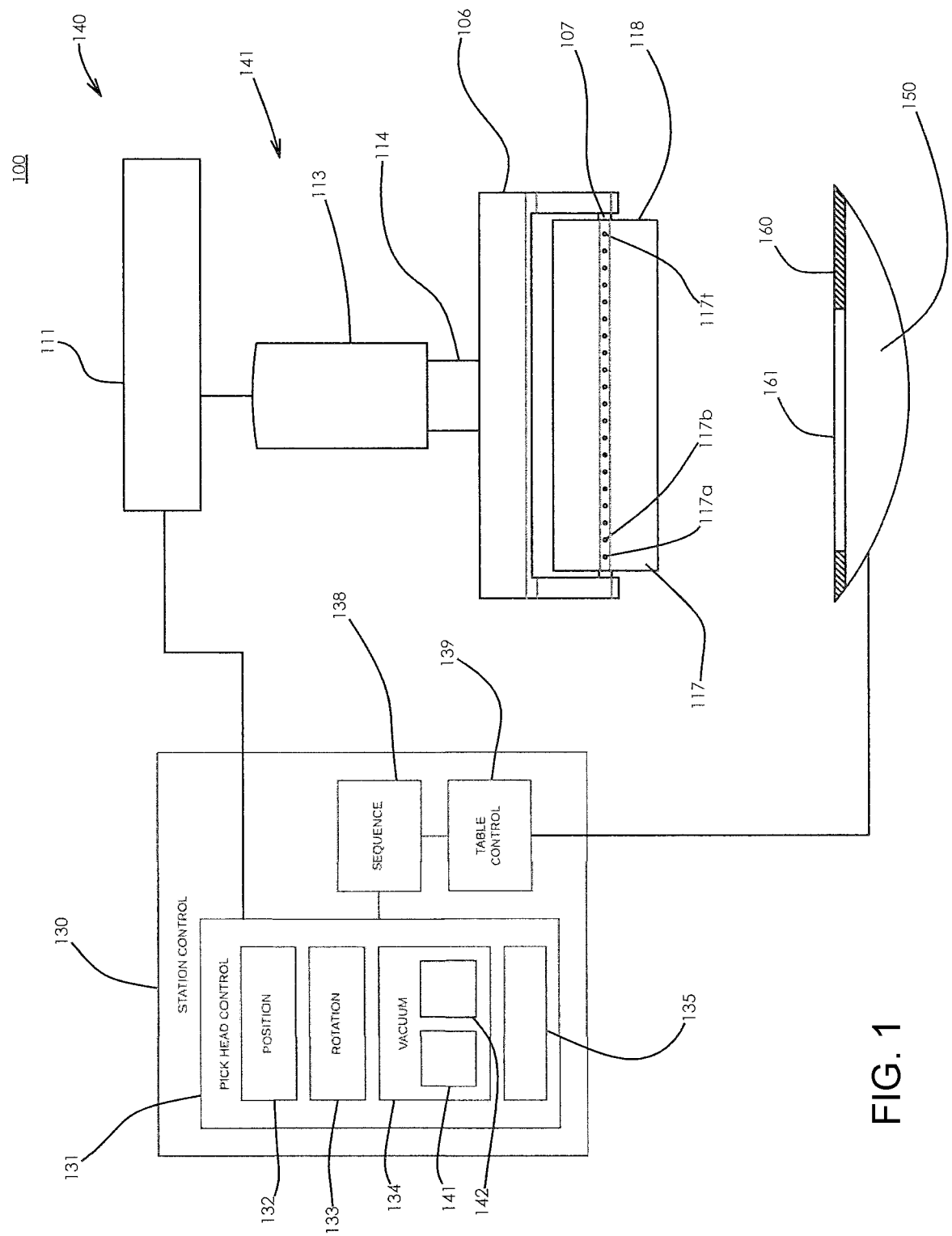
FIG. 1 is schematic and elevation view diagram illustrating an apparatus in accordance with an embodiment of the present disclosure.

FIG. 1 is a schematic and elevation view of an automated pick station 100 that includes a table 150, a pick head assembly 140, and a station controller 130. A flexible sheet 160 of material has been placed upon table 150. Individual pieces have been separated from the flexible sheet 160, and are also referred to herein as "cut pieces", "workpieces", and "select pieces". The table 150 can be a cutting table at which the cut pieces are separated from the flexible sheet 160 after a flexible sheet of uncut material has been positioned on the table 150. A specific cut piece 161 is illustrated in cross section.

According to an embodiment, the flexible sheet 160 can include an organic material, a non-organic material, and combinations thereof. The flexible sheet can include a plurality of layers that themselves can be sheets of different materials. The flexible sheet 160 can be made from a fibrous or non fibrous material. Fibrous materials can be woven or non-woven. A non-fibrous material can include a polymer, a plastic, the like, and combinations thereof. An example of a non-woven fibrous material is one in which fibers are arranged in overlapping curves, as is the case, for example, with spun-bonded polyolefin materials. Woven and non-woven materials can be placed on, or otherwise integrated with a sticky material, such as a resin. Different layers of a flexible sheet can perform different functions. For example, the flexible sheet can include a reinforcement layer, an adhesion layer, and the like. For purposes of description, it is presumed the flexible sheet 160 includes carbon-fiber material.

The pick head assembly 140 includes a positioner assembly 111 and a pick head 141 that includes a support column 113, a rotator 114, a yoke frame 106, and a cylinder 118. The pick head 141 is connected to the positioner assembly 111, which can move the pick head in lateral, transverse, and vertical directions. The term "lateral direction" as used herein in reference to the pick head 141 is intended to mean the direction as defined by the axis of the cylinder 118, the term "transverse direction" as used herein refers to the direction orthogonal to the lateral direction that is also parallel to the surface of table 150, and the term "vertical direction" as used herein refers to the direction orthogonal to the lateral and transverse directions, and is thus orthogonal to the surface of table 150.

The support column 113 is connected to a rotator 114 that can rotate along a vertical axis. A yoke frame 106 is also connected to the rotator 114, and can also be rotated about a vertically axis by the rotator 114. An axis bar 107 extends between arms of the yoke frame 106 to support the cylinder 118. The cylinder 118 rotates about the axis bar 107 and includes a cylindrical surface. The cylindrical surface includes a lateral region that includes a plurality of orifices 117, including orifices 117A-117T. The lateral region can be referred to a band of orifices, and has a length dimension that extends laterally across the cylindrical surface, e.g., in the direction of the axis bar, and a width dimension, e.g., a peripheral dimension, that wraps around the cylindrical surface in a direction orthogonal to the lateral direction. Each one of the orifices 117A-117T is an individually controlled vacuum orifice. Thus, a negative pressure can be applied at each orifice of the plurality of vacuum orifices 117A-117T independent of each other of the vacuum orifices. A negative pressure is also referred to herein as a vacuum. The term "vacuum" as used herein is intended to be a generic term for a negative pressure consistent with the application described herein.

Operation of pick head assembly 140 and the table 150 can be controlled by station control circuitry 130, also reference to as static controller 13, to which they are connected. The station controller 130 can be an application specific circuit, a general purpose circuit, or a combination thereof. According to an embodiment, the station controller includes a general purpose instruction-based data processor, and memory circuitry that stores specific instructions to implement some or all of the operations described herein. The station controller 130 includes pick head control circuitry 131, table control circuitry 139, and sequencing circuitry 138. Each one of the various circuits includes one or more outputs that are connected to corresponding inputs of the pick head assembly 110 and the positioned assembly that moves the pick head. The pick head control circuitry 131 includes position circuitry 132, rotation circuitry 133, vacuum circuitry 134, and other circuitry 135. Each one of above referenced circuits of the station controller 130 can itself include a plurality of circuits that implement specific functions. For example, the vacuum control can include circuits 146 and 147 as will be discussed in greater detail herein.

During operation, the station control circuitry 130 manipulates the pick head assembly 140 to remove cut pieces from the flexible sheet 160. Operation of the pick station 100 and its various components will be better understood in reference to the flow diagram of FIG. 2, which represents a generalized control sequence implemented by the station control circuitry 130, and accompanying FIGS. 3-12.

Figure 2:
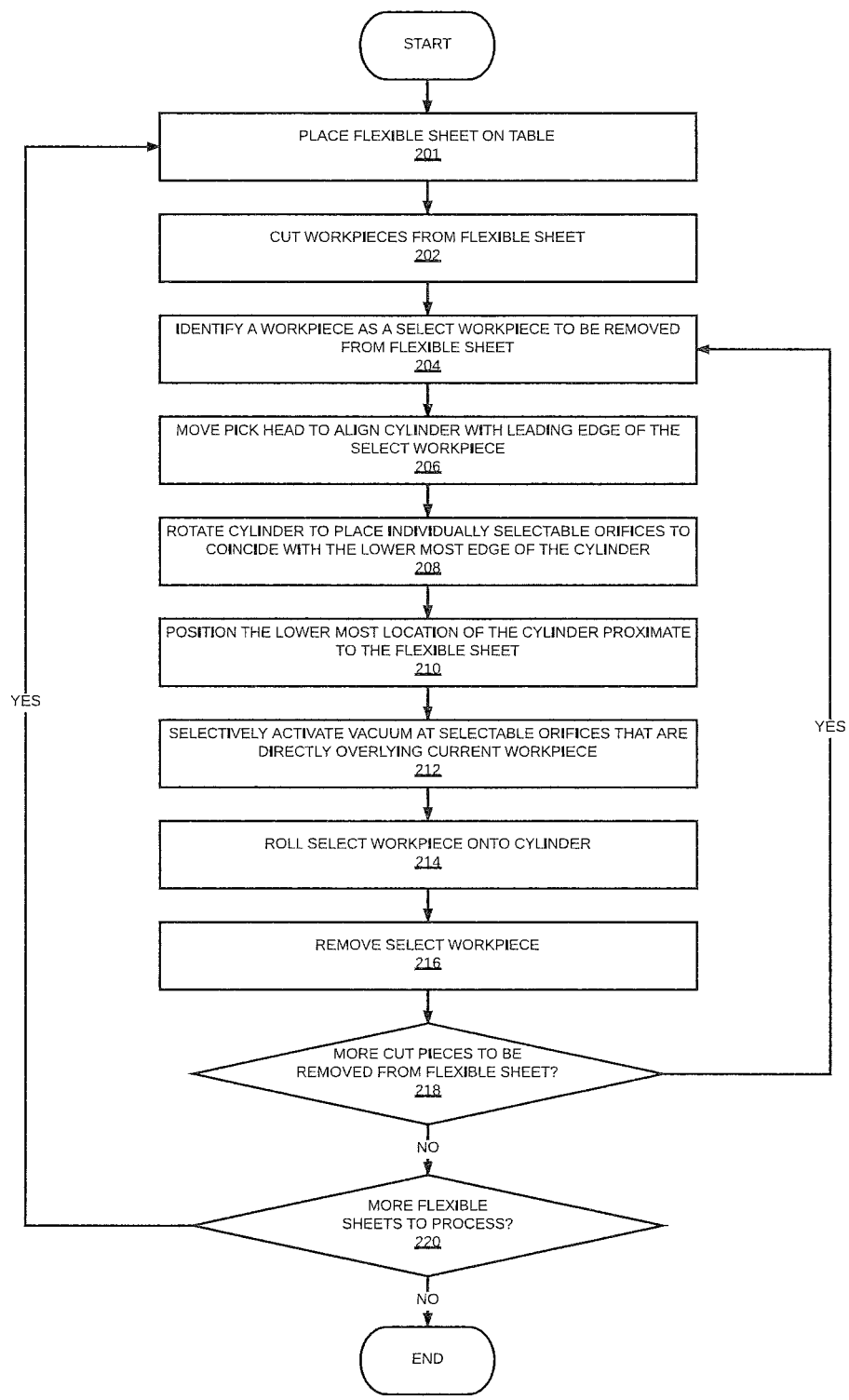
FIG. 2 is a flow diagram of a method in accordance with an embodiment of the present disclosure.

At block 201 of FIG. 2, the sequencing circuitry 138 enables operation of the table control circuitry 139 to place flexible sheet 160 on the table 150. In response, the table control circuitry 139 generates various control signals at its outputs to control placement of the flexible sheet 160 upon the table 150. For example, table control circuitry 139 can generate control signals at its outputs to position the flexible sheet 160 upon the table 150, as illustrated at FIG. 2. According to an embodiment, the control signals generated by the table control circuitry 139 can control mechanisms (not shown) that advance the flexible sheet 160 across the table from a bolt (not shown). For example, a roller attached to a used portion of flexible sheet 160 can be rotated by a motor to wrap a used portion of sheet 160 thereon, while simultaneously advancing a new flexible sheet from a bolt onto the table. According to an embodiment, the flexible sheet 160 is secured in place on the table by its ends, thereby preventing the flexible sheet 160 from being completely lifted off of the table 150. For example, the signals from table control circuitry 139 can cause the rollers holding the bolt and the used flexible sheets to be locked into place. In another embodiment, it is not necessary for the entire sheet of material to be positively secured against the table 150. Similarly, the sheet can be positioned manually.

Figure 3:
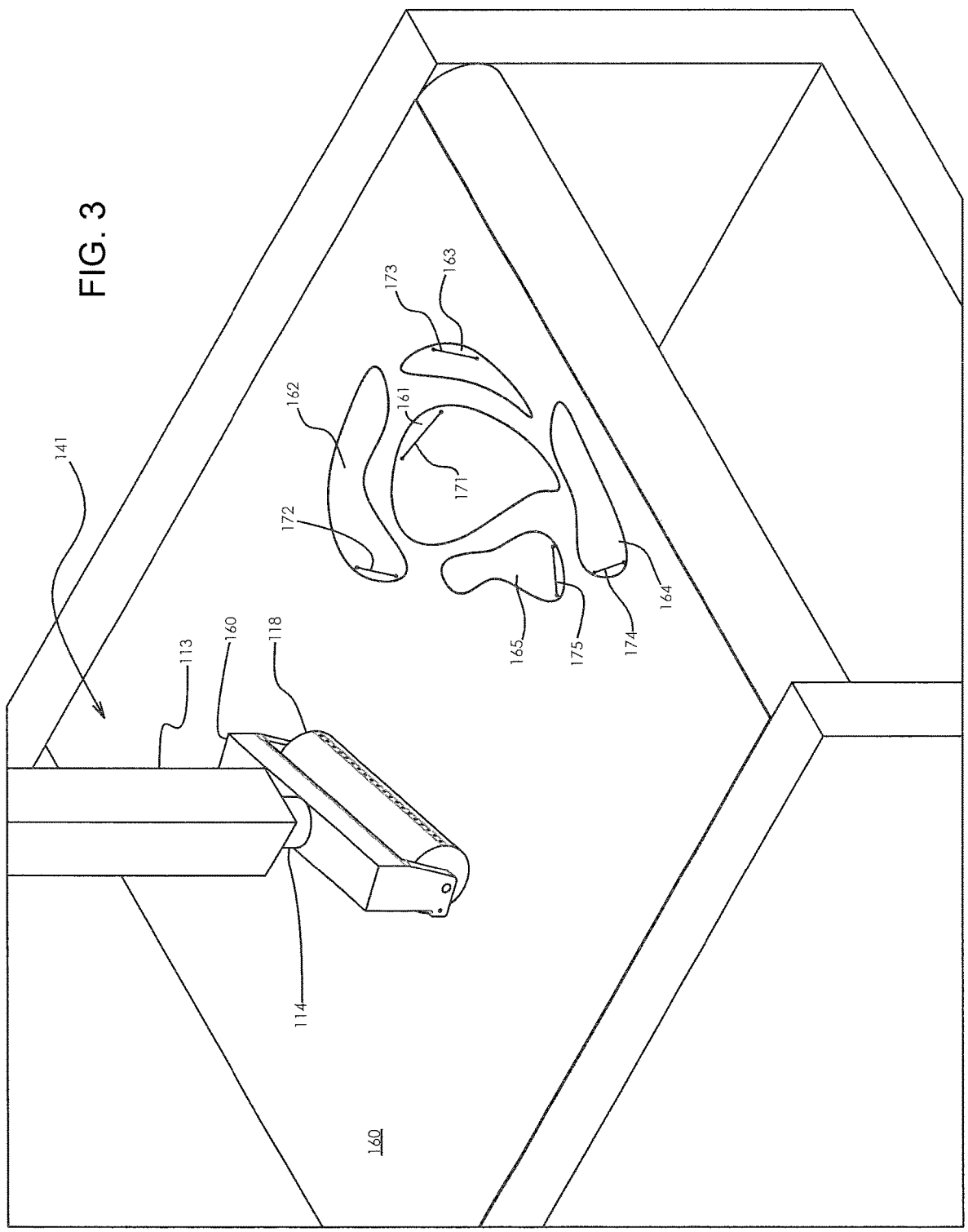
FIG. 3 is perspective view diagram that illustrates the pick head assembly of FIG. 1 at a particular location.

At block 202, the sequencing circuitry 138 enables the table control circuitry 139 to generate various control signals at its outputs to control a cutting apparatus (not shown) that cuts the individual workpieces to separate them from the flexible sheet 160, including cut pieces 161-165 as illustrated at FIG. 3. The term workpiece, cut piece, or select piece, as used herein, is intended to refer a portion of the flexible sheet 160 that has been fully or partially separated from the flexible sheet 160, so that it can be removed from the flexible sheet 160 using the pick head assembly as described herein. Also, the manner in which a cut piece can be separated from the flexible sheet 160 can vary. For example, a cut piece can be separated from the flexible sheet 160 by a tool having a sharp edge, a hot edge, a laser, the like, and combination thereof.

At block 204, the sequencing circuitry 138 enables circuitry to determine a next cut piece to be removed from the flexible sheet 160. According to an embodiment, the cut pieces can be identified by entries of a table, a linked list, and the like. For example, each entry of a list can reside at a storage location, and corresponds to a specific cut piece. The list can be a sequential list, wherein a pointer can be maintained that indicates a currently identified workpiece, referred to as a select workpiece or a current workpiece. A next cut piece can be identified by advancing to a next entry of the sequential list. In another embodiment, each entry can include pointer information that indicates where information for a next workpiece resides.

Each entry of such a list corresponding to a cut piece can include information that defines a leading edge location and length of the cut piece. The location of the leading edge can be identified by two endpoints of a line, a vector, and the like. For example, referring to FIG. 4, the leading edge of cut piece 161 can be identified by providing the table coordinates of point 166 and point 167 to define the line 171. The entry can also include information that indicates a direction orthogonal to its corresponding leading edge, e.g., line 171, that indicates to which side of line 171 the cut piece 161 resides. The entry can also include an indication of the length of the select piece 171 in an orthogonal direction relative the leading edge 171. This direction and length information can be used to determine a direction and distance to move the cylinder 118 when removing a cut piece.

The identified leading edge of each workpiece 161-165 can be independently identified by its entry information. Thus, the orientation of each workpiece's leading edge can be independent of the orientation of each of the other leading edges. Thus, the leading edge 171 can be the same or different as some or all of the other workpieces' leading edges 172-175 indicated in FIG. 3. By way of illustration, it is presumed that workpiece 161 has been identified by block 204, and is, therefore, the current workpiece.

At block 206, the sequencing circuitry 138 enables the position control circuitry 132 to generate various control signals at its outputs that are provided to the positioning assembly 111 that moves the pick head 141 and rotator 114 to a location overlying the leading edge information of the current workpiece. For example, in FIG. 4 the cylinder 118 has been moved from its previous position away from select workpiece 161, as illustrated at FIG. 3, to a current position based upon the information that defines leading edge 171. In an embodiment, the motion control circuitry 139 moves the pick head 141 and rotator 114 so that a lateral edge of cylinder 118 that is closest the table 150 is parallel to and directly overlying the line corresponding to the leading edge of the select workpiece. For ease of discussion, the term "lower-most edge" as it refers to cylinder 118 is intended to mean a lateral edge of cylinder 118 that is closest the table 150.

Figure 4:
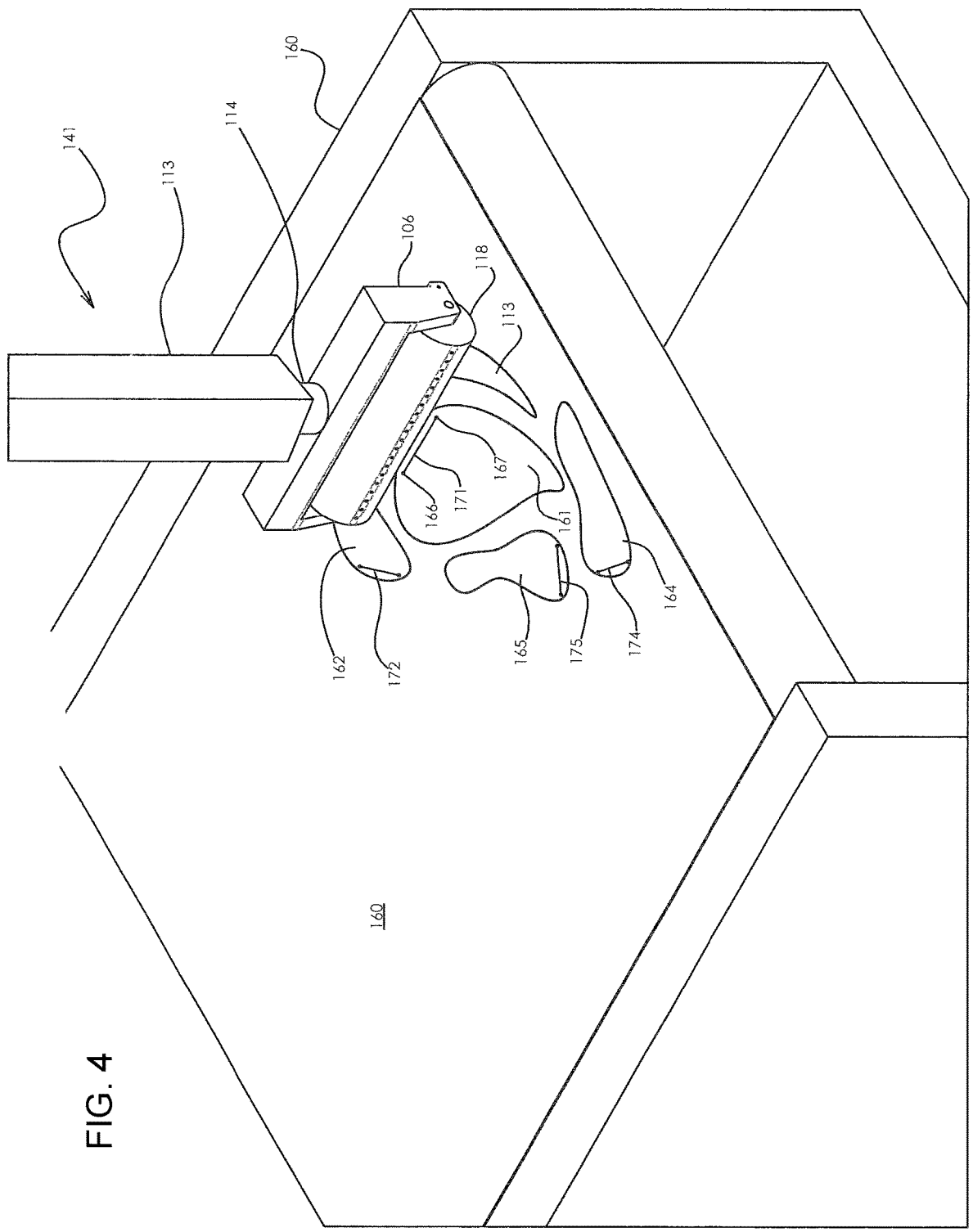
FIG. 4 is perspective view diagram that illustrates the pick head assembly of FIG. 3 at a different location.
Figure 5:
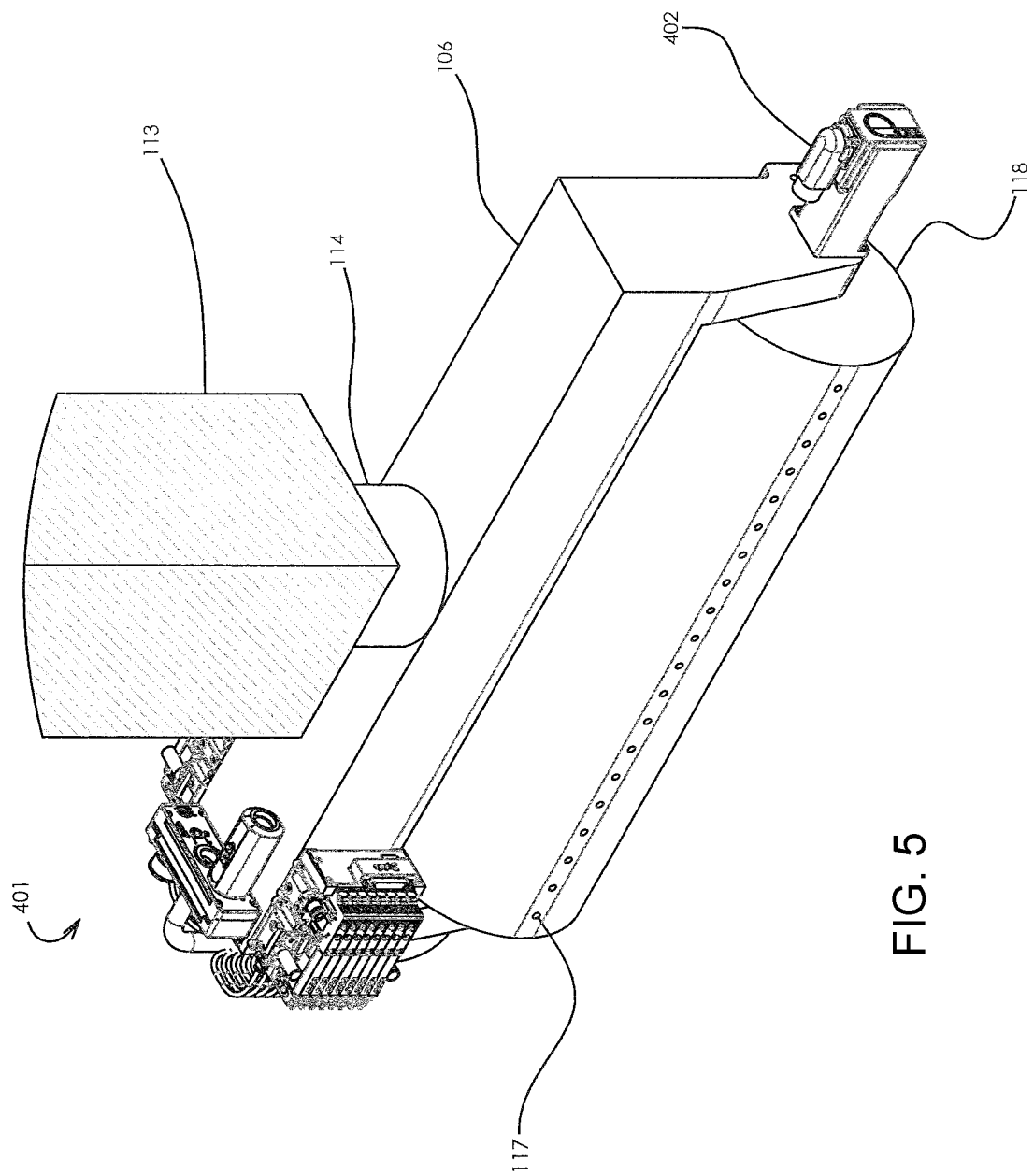
FIG. 5 is a close-up view of a portion of a pick head assembly of FIG. 4, in accordance with a specific embodiment.

FIG. 5 illustrates a more detailed view of a specific embodiment of a portion of the pick head 141 of FIG. 4. Specifically, FIG. 5 illustrates that the lateral region that includes orifices 117 does not yet coincide with the lower-most edge of the cylinder 118, but instead coincides with a leading edge of cylinder 118. FIG. 5 further illustrates additional detail of the pick head 110, including a vacuum actuator 401, and motor 402. Vacuum actuator 401 includes input terminals (not shown) that are connected to outputs of the vacuum control circuitry 133. According to an embodiment, the vacuum actuator 401 can include a control mechanism for each one of the individually selectable orifices 117A-117T, such as a separate solenoid, which can be activated, e.g., enabled, by signals generated by the vacuum control circuitry 134 to apply a vacuum at its corresponding orifice. The motor 402 includes input terminals (not shown) that are connected to outputs of the rotation control circuitry 133 to rotate the cylinder 118 to a desired orientation. This can be accomplished by controlling the rotator 114 while the cylinder 118 is not in contact with sheet 160, or by controlling the positioner assembly while the cylinder 118 is in contact with flexible sheet 160. The positioning of cylinder 118 over the select workpiece will be described in greater detail in reference to FIG. 6, below.

Figure 6:
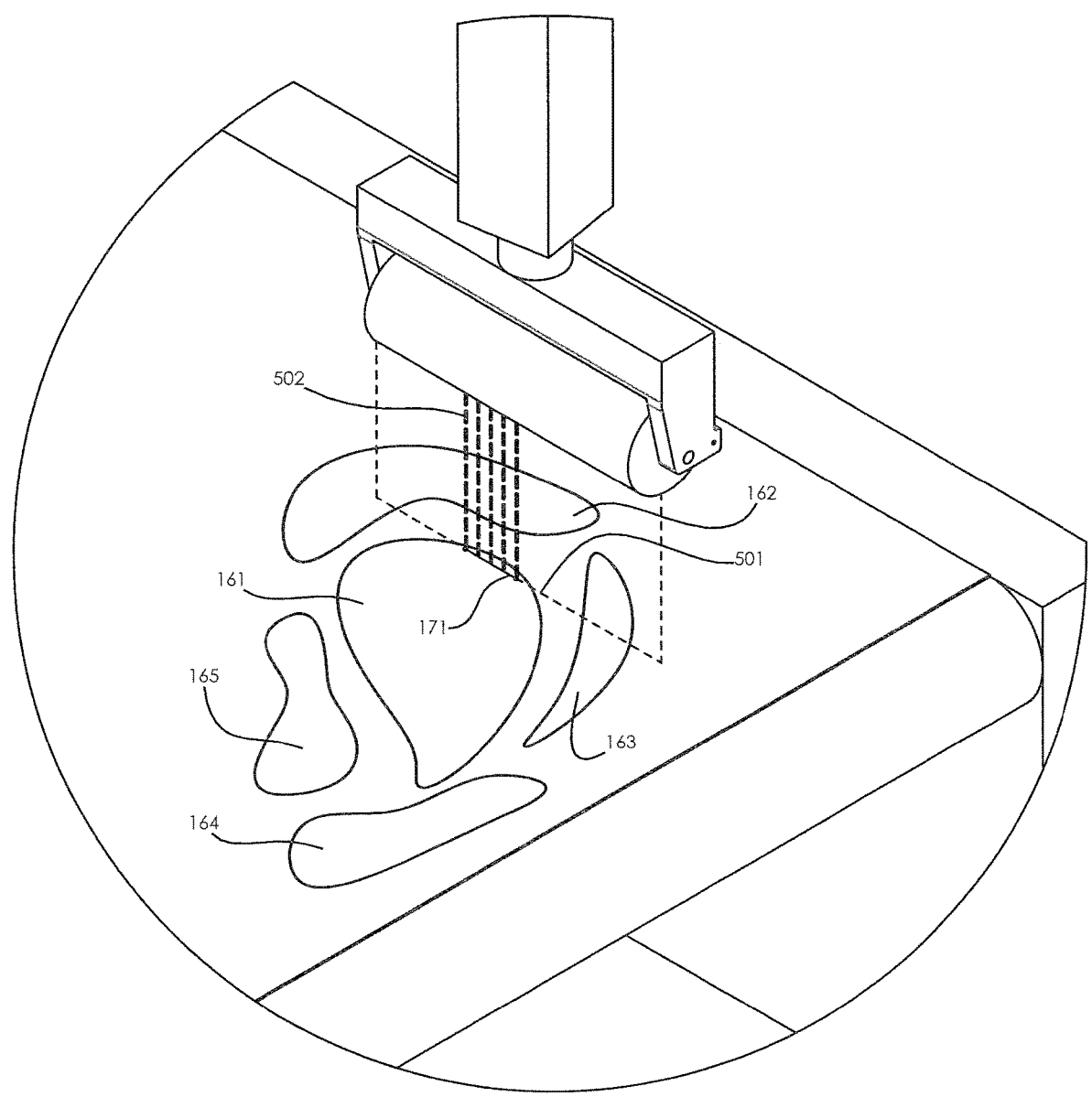
FIG. 6 is a perspective view diagram that illustrates a cylinder of the pick head assembly of FIG. 4 at a different orientation.

At block 208 (FIG. 2), the sequencing circuitry 138 enables the rotation control circuitry 139 to generate various control signals at its outputs that are provided to the motor 402 to rotate the cylinder 118 so that the orifices 117 are positioned at the lower-most location of the cylinder 118. FIG. 6 illustrates the pick head 100 at the same location as FIG. 4 after the cylinder 118 has been rotated to orient the orifices 117 at a lower-most position of cylinder 118. FIG. 5 illustrates a line 501 that is defined by an imaginary radial projection from the orifices 117A-117T onto the flexible sheet 160. The line 501 is coincident with the leading edge 171 of select workpiece 161. A portion of the orifices 117A-117T directly overlies the leading edge of the select workpiece 161.

At block 210 (FIG. 2), the sequencing circuitry 138 enables the position control circuitry 132 to generate various control signals at its outputs that cause the positioning assembly to lower the cylinder 118 to place the lower-most edge of the cylinder 118, which includes the orifices 117, in contact with, or close proximity to, the flexible sheet 160 to allow communication between vacuum chambers connected to the orifices 117 and the flexible sheet 160. For ease of discussion, it is presumed that the lower-most location of the cylinder 118 is in contact with the flexible sheet 160.

At block 212, the sequencing circuitry 138 enables selective control circuitry 146 of the vacuum control circuitry 132 to generate various control signals at its outputs that are provided to the vacuum actuator 402 to enable a vacuum at a subset of the orifices 117. The subset of orifices at which the vacuum is to be applied can be determined by the information defining the leading edge 171 of select workpiece 161. Conversely, the vacuum control circuitry 132 can also be said to generate control signals to disable a vacuum at the orifices 117 that are not part of the subset of orifices. For example, the vacuum control circuitry 132 can ensure that those orifices that do not directly overly the select workpiece 161 are disabled, e.g., no vacuum is present. Referring to FIG. 6, the five dashed lines 502 correspond to radial projections from a subset of five orifices of orifices 117 that directly overly the leading edge 171. This subset of orifices is also referred to herein by reference number 502, and is presumed to include orifices 117G-117K. As a result, the portion of the select workpiece 161 over which the subset of orifices 502 resides is in communication with the vacuum chambers of the orifices 502.

Figure 7:
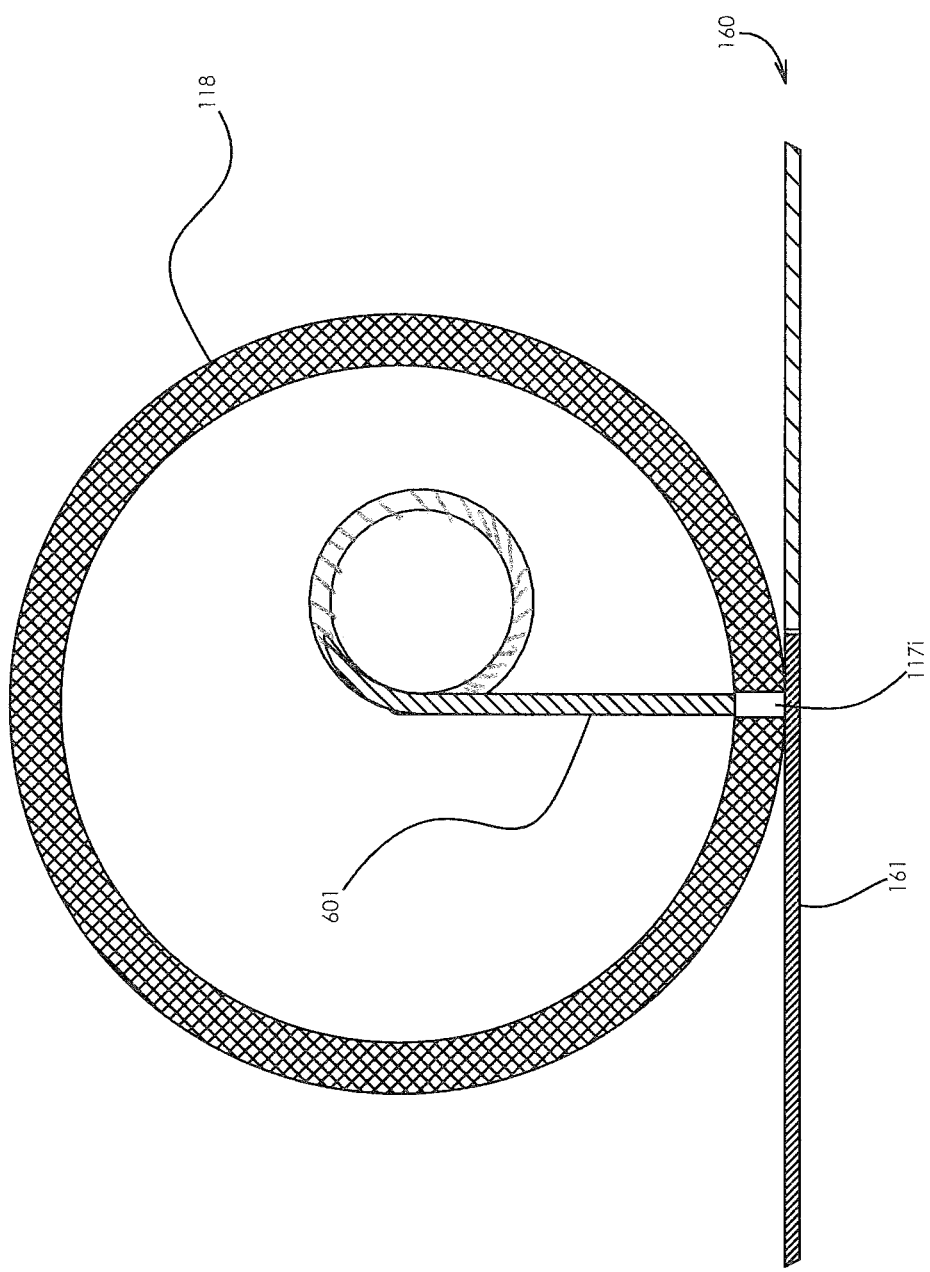
FIG. 7 is a cross-sectional view diagram illustrating an orifice of a cylinder of a pick head engaged with a cut piece in accordance with an embodiment of the present disclosure.

FIG. 7 illustrates a cross sectional view of cylinder 118 in contact with select workpiece 161. The view further illustrates a representative orifice 117I of the plurality of orifices 117I that is a member of the subset of orifices 502, a vacuum tube 601 that can be connected to a corresponding solenoid controlled by the vacuum actuator 402 to either enable or disable a vacuum at a vacuum chamber defined by vacuum tube 601. The vacuum tube 601 is cross-hatched in FIG. 7 to indicate a vacuum is being maintained within its vacuum chamber. It will be appreciated that station 100 is configured to apply a vacuum, e.g., a negative pressure, to the vacuum chamber that is sufficient to engage the select workpiece for the purposes described herein. Also illustrated at FIG. 7 are tangential projection lines 791 and 792. Tangential projection line 791 is a line tangent to a trailing-most edge 781 of the cylinder 118 in the vertical direction. Tangential projection line 792 is tangent to a leading-most edge 781 of the cylinder 118. The term "trailing-most edge" as used herein in the context of the cylinder 118 is intended to refer to the edge of cylinder 118 that is furthest behind the axis of cylinder 118 as the cylinder advances. Thus, as illustrated, because the cylinder 118 will advance from right to left when removing the cut piece 161, the trailing edge of the cylinder is the right-most edge 781. Conversely, the edge that is in front of the axis as the cylinder advances is referred to herein as the advancing-most edge, and represents the edge of cylinder 118 that is furthest in front of the cylinder 118. The term "under the trailing portion of the cylinder" is intended to refer to the space below the cylinder 118, to the left of tangential line 791, and to the right of orifice 117I. Similarly, the term "under the leading edge of the cylinder" is intended to refer to the space below the cylinder 118, to the right of tangential line 792, and to the left of orifice 117I.

Figure 8:
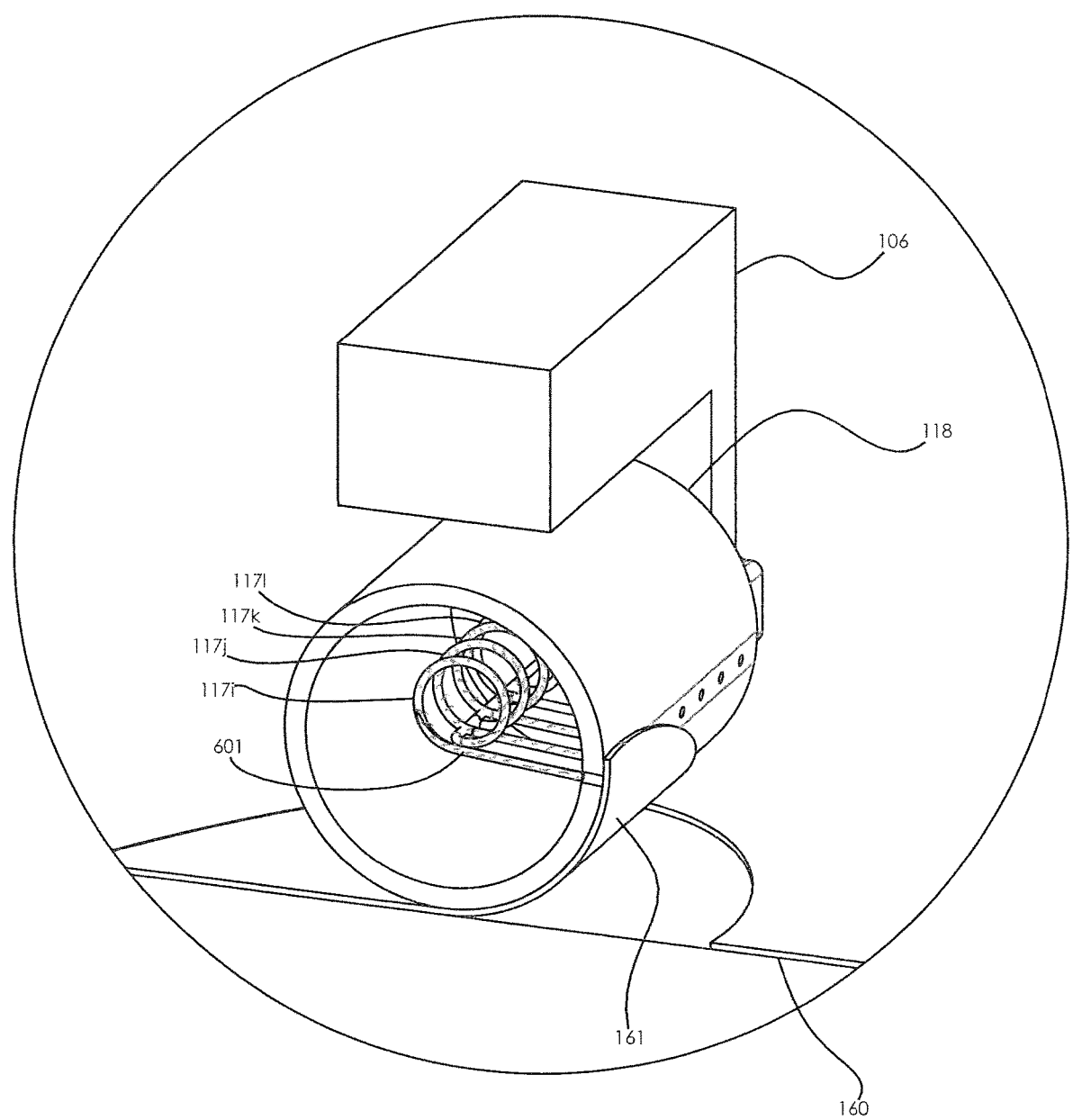
FIG. 8 is a perspective view diagram of a pick head in accordance with the present disclosure, as it rolls a cut piece onto a cylindrical surface.

At block 214, the sequencing circuitry 138 enables the position control circuitry 132 to generate various control signals at its outputs to move the cylinder 118 along the flexible sheet 160 in a direction orthogonal to the leading edge. The orthogonal direction can be determined by information corresponding to the select workpiece 161. Because the leading edge of the select piece is in communication with the enabled vacuum chambers, and because portions of the flexible sheet 160 adjacent to the select piece are not in positive communication with any orifices having enabled vacuum chambers, the select piece can be rolled onto the cylinder 118 as it advances across the flexible sheet 160. FIG. 8 illustrates a perspective view of the cylinder 118 as the select workpiece 161 is being rolled onto the cylinder 118 from the flexible sheet 160. Vacuum tubes for orifices 117I-117L are specifically illustrated. Orifices 117I-117K are cross-hatched in FIG. 8 to indicate that a vacuum is being enabled at their corresponding vacuum chambers. Orifice 117L is not cross-hatched in FIG. 8 to indicate a vacuum is disabled at its corresponding vacuum chamber. The cylinder 118 continues to advance until the select workpiece 161 has been completely removed from the flexible sheet 160. In an embodiment, the cylinder 118 advances an amount based upon a length of the workpiece as stored with information corresponding to select workpiece 161.

At block 216 of FIG. 2, after the cut piece has been rolled out to the cylinder 118, and the sequencing circuitry 138 enables the position control circuitry 132 to generate various control signals at its outputs to lift and move the cylinder 118 while the select workpiece 161 remains rolled onto the cylinder 118 to a location at which the select workpiece is to be placed, e.g., removed from the cylinder 118. Placement of the workpiece, such as in a bin containing similar workpieces or on a stack of desired workpieces of the same or different shape, can be accomplished by moving the cylinder 118 over a placement surface. The cylinder/current workpiece combination can be removed without placing the current workpiece 161 in contact with a placement surface, e.g., by rotating the cylinder 118 using motor 402. Placement of the select workpiece can also be accomplished by placing the workpiece, while rolled onto the cylinder 118, in contact with a placement surface and advancing the cylinder so that the select workpiece is unrolled onto the surface. Disabling the selected orifices allows transfer of the cut piece At block 218, the sequencing circuitry 138 determines if there are more cut pieces that need to be removed from the flexible sheet 160. For example, are there other entries in a list. If so, the operation proceeds to block 204 where the next workpiece is identified as the select workpiece as previously described. Otherwise, the flow proceeds to block 220. At block 220 the sequencing circuitry 138 determines if there are more sheets to be processed. If so, the operation proceeds to block 201 and a next flexible sheet 160 is placed over the table 160 as previously described. Otherwise, the flow proceeds to block 222 and the flow is completed.

The cylinder configuration described herein having a lateral region of selectively controllable vacuum orifices can be advantageous over applications using planar arrays of vacuum orifices and planar arrays of needle-and-hooks connectors by virtue of providing a reduction in the number of costly selectively controlled coupling elements that are typically used with planar arrays. Furthermore, by virtue of using a curved surface to progressively lift and separate the select piece from the adjacent material, e.g., a peeling motion, instead of lifting an entire cut piece simultaneously, this proposed solution greatly reduces the overall forces required to separate materials along the cut lines and reduces the potential for unintended lifting of surrounding materials due to residual coupling or cohesion between the select piece and surrounding material.

Figure 9:
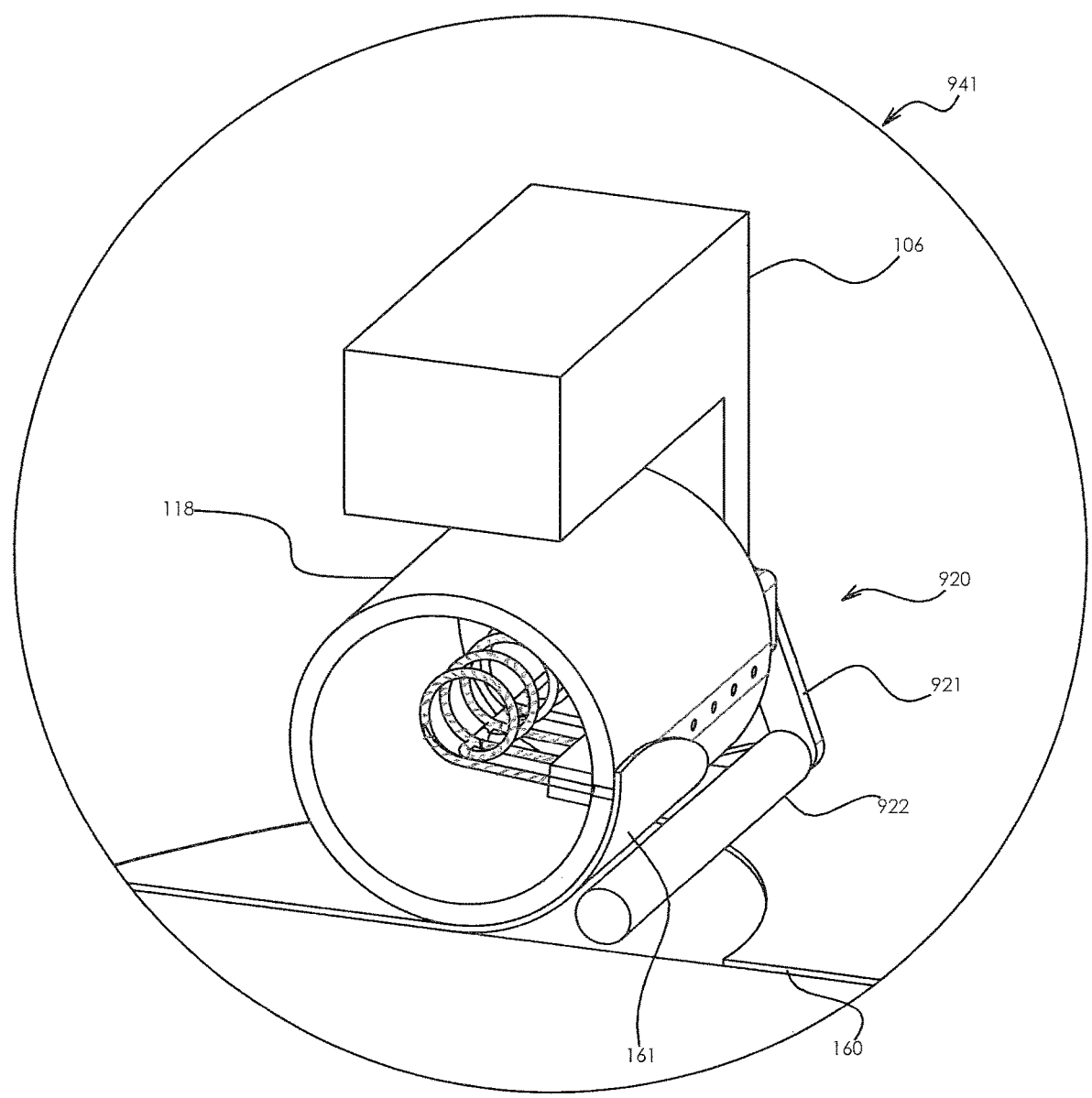
FIG. 9 is a cross-sectional elevation view diagram of a pick head that includes a separator rail in accordance with an embodiment of the present disclosure.

FIG. 9 illustrates a portion of a pick head 941 in accordance with an embodiment. Features of FIG. 9 that are similar in form and function of previously described features maintain the same reference numerals as the embodiment. In addition to features similar to those previously described, the pick head 941 includes a separator assembly 920. The illustrated portion of the separator assembly 920 includes an arm 921, and separator rail in the form of a roller 922. The arm 921 is attached to the yoke 106 and to the roller 922. The roller 922 can rotate about its axis and has a length that can be the same or different than that of the cylinder 118. The axis of the roller 922 is parallel to axis of the vacuum cylinder 118. In other embodiments, the separator assembly is not attached to the yoke 106, but is instead an apparatus separate from the pick head assembly, such as a separate robotic device, that can be positioned and controlled independently. Bar 921 can be in a fixed position relative the cylinder 118 so that the roller 922 resides at a transverse location behind the lower-most edge of cylinder 118. In an embodiment, some or all of the roller 922 can reside under the trailing edge of cylinder 118, and is, therefore, between the table 150 and the trailing edge of the cylinder 118. Thus, at least a portion of the roller 922 is directly below a portion of the cylinder 118. It will be appreciated that in FIG. 9, the region of the cylinder 118 that includes the orifices 117 is positioned at "the trailing edge" of the cylinder 118 as previously described. As such, the trailing edge of the cylinder 118 can extend beyond the trailing edge of the roller 922. The trailing edge of the roller 922 can extend beyond the trailing edge of the cylinder 118. The trailing edge of the roller 922 and the trailing edge of the cylinder 118 can be coincident in a vertical direction.

During removal of a select piece, the roller 922 is placed in contact with the non-selected portion of sheet 160 that is adjacent the cut piece 161 and is thus outside the extents of the leading edge of the selected cut ply. As the yoke 106 is initially advanced, such as by rolling the cylinder 118 across the surface of the select piece, the separator rail remains in contact with the un-selected adjacent material, thereby holding the remaining portions of the flexible sheet 160 against the surface of table 118 to prevent the adjacent material from being lifted away from the table along with the select piece.

As the pick head 910 is advanced to remove the select workpiece 161, the separator assembly 920 is simultaneously advanced to maintain a portion of the roller 922 between the select piece wrapped onto the cylinder 118 and the table 150, and another portion of the roller 922 being between adjacent portions of the flexible sheet 160 and the cylinder 118. In this manner, the adjacent portions of the flexible sheet 160 are held down, e.g., remain in contact with the table 150. Contact with the lower surface of the separator rail prevents the un-selected material of sheet 160 from being rolled onto the face of the cylinder. Additionally, the use of the separator rail can facilitate separation between the select workpiece 161 and the flexible sheet 160 in the event the select workpiece 161 remains attached to the flexible sheet 160 by a residual portion, either intentionally or unintentionally. The use of the separator rail can reduce damage to a select workpiece residually attached to adjacent portions of the flexible sheet 160 by preventing the flexible sheet from being lifted away from the table during the removal process, and by providing a low resistance to the flexible sheet 160 in the transverse direction as the roller advances. The use of a separator rail can also reduce movement and disorganization of the remaining flexible sheet that could otherwise make further automated picking difficult or impossible.

In an advantage of this embodiment, is that as the pick head assembly 910 and roller 922 are advanced, the lower surface of the roller 922 remains in contact with the upper surface of the surrounding material. This downward mechanical pressure serves to secure portions of the flexible material 160 that are not part of the cut piece against the table 150 while the leading edge of the roller 922 continuously forces separation of the material along a small portion of each cut line as it advances. This simultaneous positive separation and of material by the upper surface and lower surface of the Roller can act to forcibly separate the select piece from any residual material of the flexible sheet that may remain.

Figure 10:
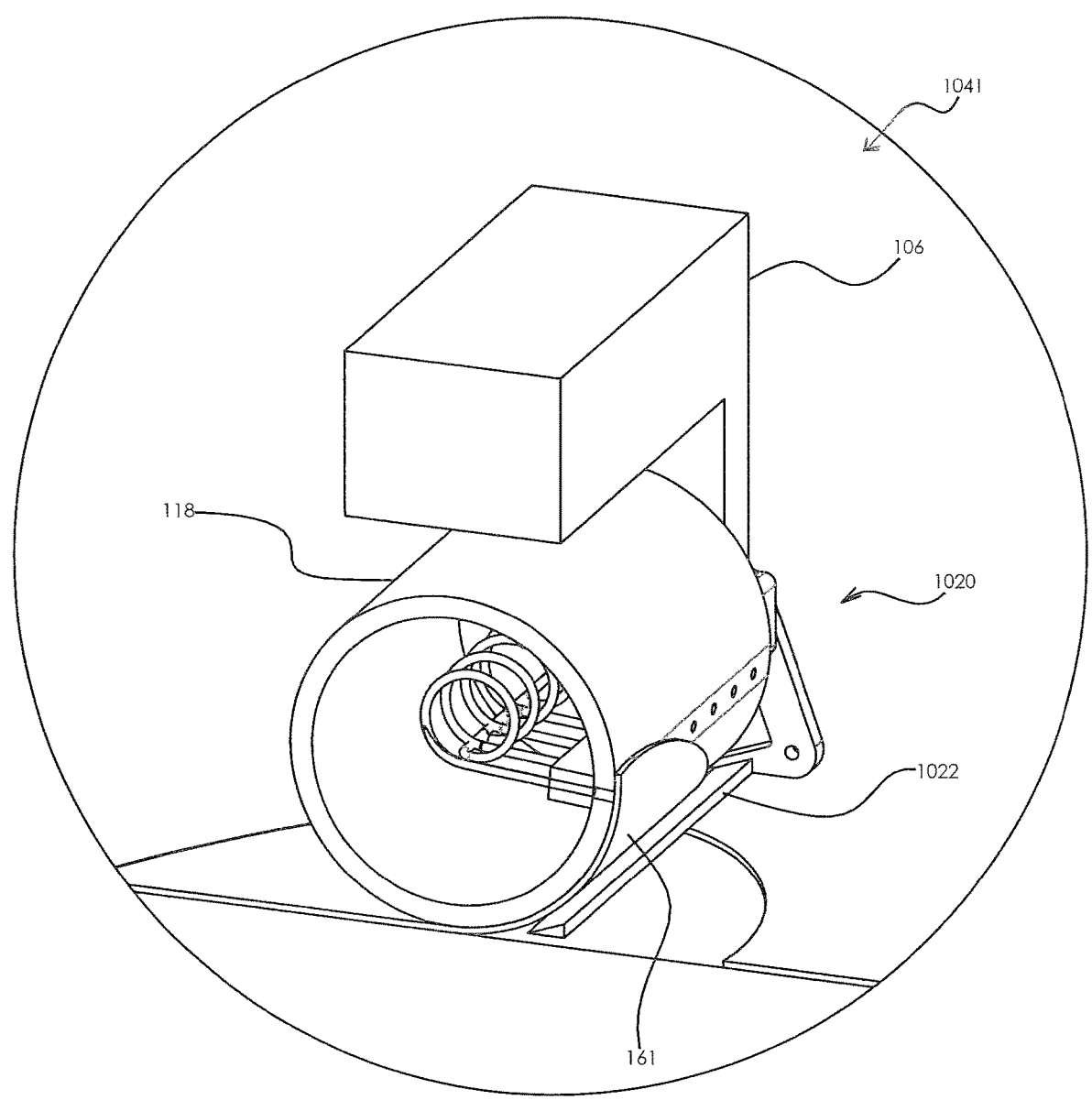
FIG. 10 is a cross-sectional elevation view diagram of a pick head that includes a separator rail in accordance with an embodiment of the present disclosure.

FIG. 10 illustrates a portion of a pick head 1010 that is similar to the pick head 910, except that the separator rail is in the form a fixed bar 1022, as opposed to a roller. It will be appreciated that the function of the fixed bar 1022 is similar to that of the roller 922 in that it holds peripheral portions of the flexible sheet 160 down as it slides across the flexible sheet 160 while the select workpiece 161 is being wrapped around the cylinder 118. The fixed bar 1022 includes a leading edge that is wedge shaped. The wedge shape can form a sharp edge, such as a blade edge. As such, the leading edge can sever small amounts of residual material connecting the cut piece 161 to the peripheral regions of the flexible sheet as the pick head assembly advances over the cut piece to further reduce the likelihood of undesirable tearing or misplacement of material. Additionally, the wedge-like action of the separator rail serves to overcome adhesion between the select piece and adjacent material as can be commonly encountered with dealing with sticky substances such as composite materials comprising reinforcement materials pre-impregnated with matrix materials. In another embodiment of the disclosure, the separator rail can be a bar that does not include a sharp edge. In another embodiment of the disclosure, the separator rail can include reciprocating portions, such like those found on hair trimming devices or clippers.

Figure 11:
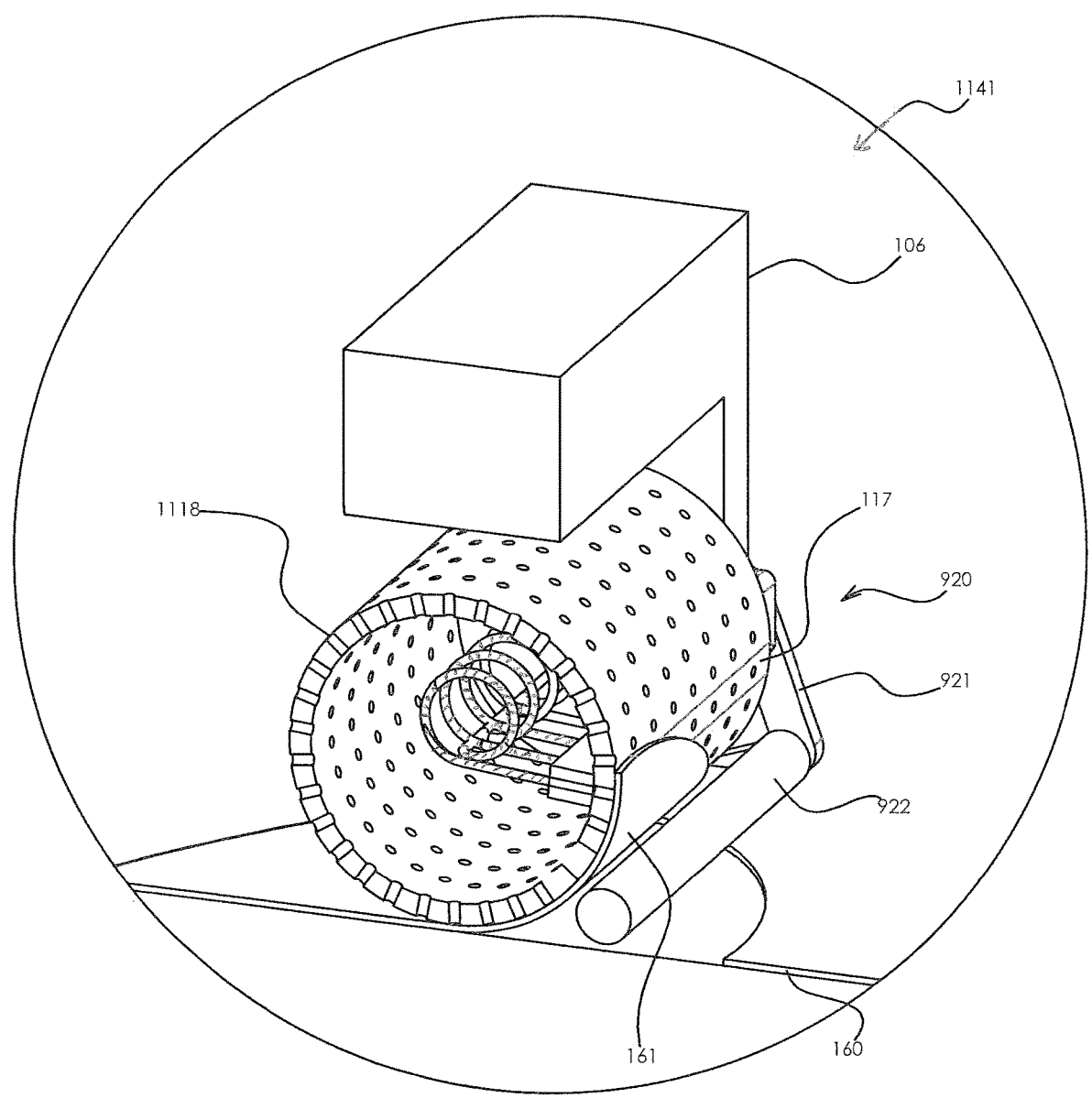
FIG. 11 is a cross-sectional elevation view diagram of a pick head that includes a cylinder that includes both individually controlled and commonly controlled suction orifices.

FIG. 11 illustrates an alternate embodiment of a pick head assembly 1110 that includes a cylinder 1118 having a set of common orifices extending around the circumference of the cylinder from one side of the individually selectable orifices 117 to the other side. Thus, the common orifices surround the individually selectable orifices 117. According to an embodiment, each one of the common orifices of FIG. 11 can share a common vacuum chamber that is defined by an inner cavity of the cylinder 1118. The vacuum chambers corresponding to the vacuum tubes of the individually selectable orifices remain individually controllable as they are not in communication with the common vacuum chamber.

During operation, a vacuum can be enabled at the common vacuum chamber by common vacuum control circuitry 142. Such an embodiment can be useful in combination with a separator rail to the extent that the force between the cut piece and the individually controlled vacuum orifices would otherwise be insufficient to maintain the select workpiece 161 in a fixed relation to the surface of the cylinder 1118 throughout the process of removing the select workpiece 161. Thus, in such a situation, the common vacuum orifices can be enabled to better hold the select piece against the cylinder 118 during the removal process. According to an embodiment, the vacuum to the common vacuum chamber can be enabled simultaneously with the individually selectable orifices 117. In another embodiment, the vacuum to the common vacuum chamber can be enabled after the individually selectable orifices 117, once the roller 922 has advanced to a position overlying the opening in the flexible sheet 160 made by lifting the leading edge of the select workpiece 161. In another embodiment, the vacuum to the common vacuum chamber can be enabled before the individually selectable orifices 117

It will be appreciated, that even though the common orifices are in communication with the portions of the flexible sheet 160 that are adjacent the select workpiece 161, these adjacent portions are held down by the separator rail to allow just the select workpiece 161 to be removed without lifting and disturbing the flexible sheet 160.

Figure 12:
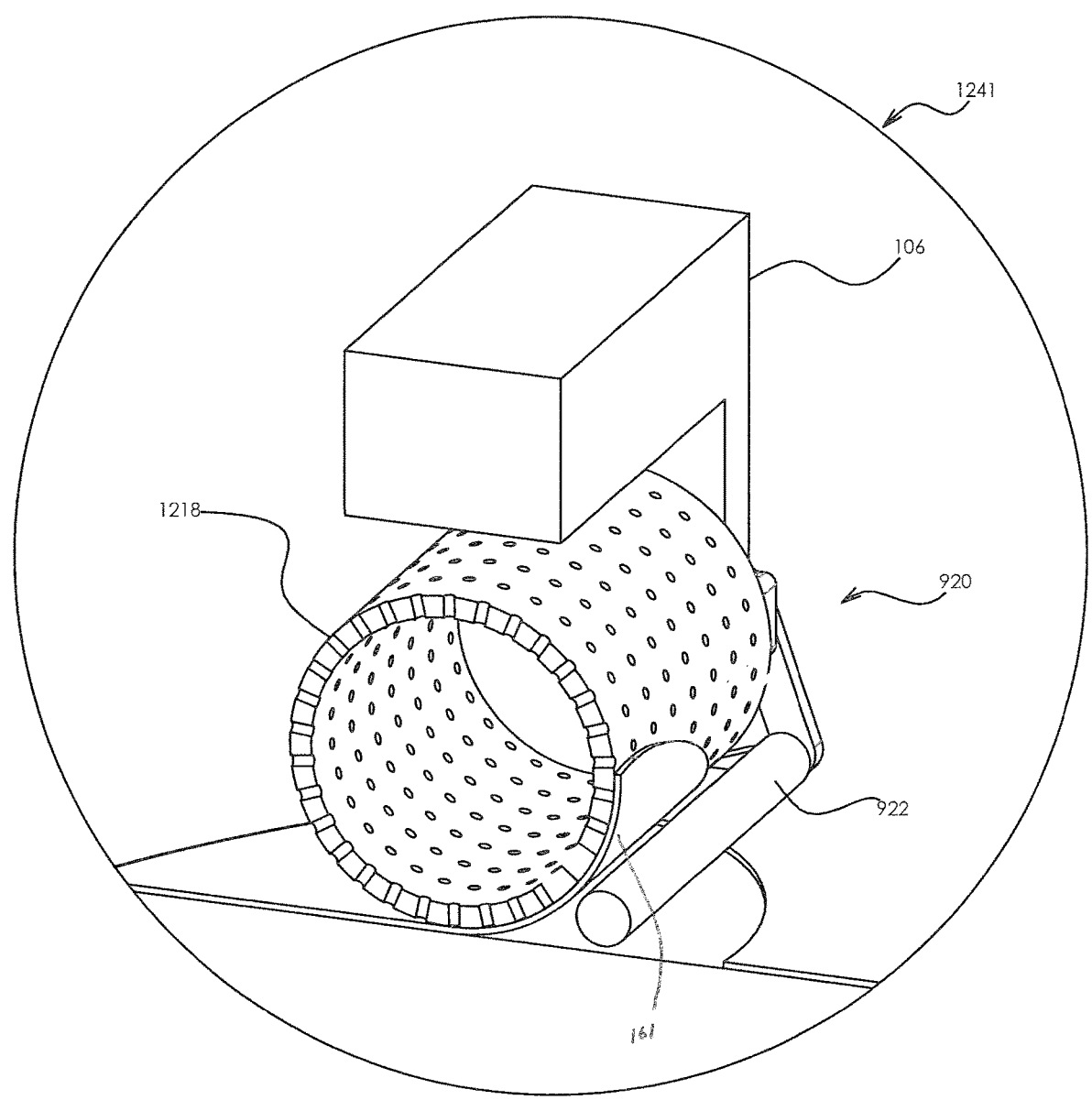
FIG. 12 is a cross-sectional elevation view diagram of a pick head that includes a cylinder that includes both individually controlled and commonly controlled suction orifices.

FIG. 12 illustrates an alternate embodiment of a pick head assembly that includes a cylinder 1218 having only common orifices extending around the perimeter of its cylindrical surface. Thus, in this embodiment, there are no individually selectable orifices 117. Each one of the common orifices of FIG. 12 are in communication with a common vacuum chamber that is defined by the inner cavity of the cylinder 1118. During operation, the cylinder 1218 is placed in contact with the leading edge of the cut piece. As a result, a portion of a lateral region of the cylinder 1218 is over the cut piece 161, while adjacent portions of the lateral region are over peripheral regions of the flexible sheet 160. A separator rail is placed in contact with a portion of the peripheral region that is near the leading edge. For example, the separator rail can be just behind the cut piece near its leading edge. As the cylinder 1218 is advanced, the separator rail maintains contact with portions of the flexible sheet that are peripheral to the cut piece to prevent them from being wrapped onto the cylinder. It will be appreciated that in this embodiment, the placement of the various cut pieces relative to each other need to be chosen so that the cylinder 1218 does not move onto a different cut piece while a select piece is being removed. Otherwise, the different cut piece will also be rolled onto the cylinder which can be undesirable. Note that the cylinder 1218 can be in initial contact with a cut piece that is not to be removed, so long as the separator bar 922 is also in initial contact with the cut piece that is not to be removed.

In a first aspect, an apparatus to remove a cut piece from a flexible sheet of material can include a pick head including a cylinder having a cylindrical surface that includes a first plurality of orifices, a plurality of vacuum chambers, and a vacuum actuator, each orifice of the first plurality of orifices is configured to be in communication with a corresponding one of the plurality of vacuum chambers and not in communication with any other one of the first plurality of orifices' corresponding vacuum chamber. The apparatus can further include a vacuum controller coupled to the vacuum actuator to enable a vacuum at a portion of the first plurality of orifices, and a rotation controller coupled to the pick head to move the cylindrical surface over the flexible sheet while a vacuum is maintained at the first portion of the orifices to wrap the first cut piece onto the cylindrical surface.

In one embodiment of the first aspect, the apparatus includes a separator rail configured to maintain a relative position to the cylinder as the cylinder rotates, the relative position of the separator rail being between a support surface upon which the flexible sheet resides and a portion of the first cut piece wrapped onto the cylindrical surface, and between a first peripheral portion of the flexible sheet that is adjacent the first cut piece and the cylindrical surface. In a more particular embodiment, the first aspect also includes, the separator rail is a roller. In another more particular embodiment, the first aspect also includes, a bottom portion of the separator rail is in contact with a portion of the flexible sheet while that is adjacent the first cut piece as the cylinder rotates to wrap the first cut piece onto the cylindrical surface. In an even more particular embodiment, the first aspect further includes the separator rail comprising a leading edge and a trailing edge, the leading edge being closer to a lower most lateral region of the cylinder surface than the trailing edge as the first cut piece is wrapped onto the cylindrical surface. In still an even more particular embodiment, the first aspect includes the leading edge being the first cut piece, including the first peripheral portion, as the first cut piece is wrapped onto the cylindrical surface. In another still even more particular embodiment, the first aspect includes the cutting edge comprising a reciprocating edge.

In another embodiment of the first aspect, the cylindrical surface further includes a second plurality of orifices, each of which is configured to be in communication with a common vacuum chamber. In a more particular embodiment, the first aspect also includes a common vacuum controller coupled to the vacuum actuator to enable a vacuum at the common vacuum chamber independent of enabling a vacuum at the plurality of vacuum chambers.

In a further embodiment of the first aspect, a separator rail configured to maintain a relative position to a lower-most lateral edge of the cylinder as the cylinder rotates, the relative position of the separator rail being between a support surface upon which the flexible sheet resides and a portion of the first cut piece wrapped onto the cylindrical surface.

In a second aspect, a method can include moving a cylindrical surface of a pick head assembly over a leading edge of a first cut piece of a flexible sheet of material, enabling a vacuum at a first plurality of orifices that reside at the cylindrical surface, and removing the first cut piece from the flexible sheet of material by rolling the first cut piece onto the cylindrical surface.

In one embodiment of the second aspect, the method includes enabling the vacuum at the first plurality of orifices does not enable a vacuum at a second plurality of orifices that reside at the cylindrical surface. In another more particular embodiment of the first aspect, the method includes cutting residual pieces of the flexible sheet that connect the cut piece to an adjacent portion of the flexible sheet.

In another particular embodiment of the first aspect, a vacuum can be enabled at each one of the first plurality of orifices independent of each other one of the first plurality of orifices. In still another particular embodiment of the first aspect, enabling a common vacuum at each orifice of a second plurality of orifices that reside at the cylindrical surface.

In a third aspect, the apparatus can include a pick head comprising a cylindrical surface populated with a first plurality of orifices and a vacuum control device, each orifice of the first plurality is configured to be in communication with a corresponding discrete vacuum chamber, of a plurality of vacuum chambers, that is not in communication with any other orifice's corresponding discrete vacuum chamber, a surface to support a flexible sheet of material comprising a first cut piece that is surrounded by a first peripheral portion of the flexible sheet, and a position controller coupled to communicate with the pick head, and configured to position the pick head so that a first portion of the first plurality of orifices is over a leading edge of the first cut piece, and a second portion of the first plurality of orifices is over a portion of the flexible sheet adjacent the first cut piece. The apparatus further includes a discrete vacuum controller coupled to communicate with the vacuum control device to enable a vacuum, after the pick head has been placed over the leading edge, at each discrete vacuum chamber having corresponding orifice that belongs to the to the first portion of orifices, to positively engage the leading edge of the first cut piece with the cylindrical surface, and to disable a vacuum at each discrete vacuum chamber of having a corresponding orifice that belongs to the first portion of orifices to prevent the first portion of the flexible sheet from being engaged with the cylindrical surface, and a rotation controller coupled to the pick head to rotate the cylindrical surface over the sheet of material, after the vacuum is implemented on the first portion of the orifices, to wrap the first cut piece onto the cylindrical surface.

In a fourth aspect, an apparatus to remove a cut piece from a flexible sheet of material can include a pick head comprising a cylinder having cylindrical surface that includes a first plurality of orifices and a vacuum actuator, each orifice of the first plurality of orifices is configured to be in communication with a common vacuum chamber, a separator rail, a common vacuum controller coupled to the vacuum actuator to enable a vacuum at the plurality of orifices, and a rotation controller coupled to the pick head to rotate the cylindrical surface over the flexible sheet while a vacuum is maintained at the plurality orifices to wrap the first cut piece onto the cylindrical surface while the separator rail prevents wrapping peripheral portions of the flexible sheet that surround the cut piece onto the cylindrical surface.

In one embodiment of the fourth aspect, the separator rail is configured to be in contact with the flexible sheet while the first cut piece is being wrapped onto the cylindrical surface. In a more particular embodiment, the fourth aspect also includes, the separator rail comprises a leading edge and a trailing edge, the leading edge being a cutting edge that is closer to a lower most lateral region of the cylinder surface than the trailing edge as the rolling action controller wraps the cut piece onto the cylindrical surface, the cutting edge configured to cut a residual portion of the flexible sheet that connects the cut piece to the peripheral portion as the first cut piece is wrapped onto the cylindrical surface. In an even more particular embodiment, the fourth aspect further includes, the cutting edge being a sharp edge. In another even more particular embodiment, the fourth aspect further includes, the cutting edge comprises a reciprocating edge.

In another embodiment of the fourth aspect, the separator rail is a roller.

The concepts of the present disclosure have been described above with reference to specific embodiments. However, one of ordinary skill in the art will appreciate that various modifications and changes can be made without departing from the scope of the present disclosure as set forth in the claims below. In particular, the sizes and numbers of various parts relative to other parts may differ from those of the illustrated exemplary embodiments. Accordingly, the specification and figures are to be regarded in an illustrative rather than a restrictive sense, and all such modifications are intended to be included within the scope of the present disclosure.

For example, while positioning of the pick head assembly 140 relative to the table has been described as being accomplished by the positioner assembly 111 and by the rotator 114, in other embodiments, positioning can be accomplished by moving the table 150 relative the pick head, and by rotating the table 150 or the pick head 141. As another example, while the selectable orifices 117 have been illustrated as being configured as a single row of orifices, e.g., a 1×20 array, in other embodiments, the lateral region containing the selectable orifices can be an array including 2 or more rows. In an embodiment, each row can be offset from its adjacent rows so that orifices at adjacent rows are not aligned. The term cylinder as used herein is intended to refer to a structure having a curved surface that when viewed in cross-section is circular, elliptical, the like and combinations thereof. In another embodiment, it will be appreciated that while for ease of discussion it has been presumed a vacuum is enabled at each individually controllable orifice directly overlying the current workpiece, though this need not be the case, as in some circumstances it may only be necessary that a portion of the orifices of subset 502 need be enabled. Also, instead of using individually controlled orifices where there is a one-to-one correspondence, individually controlled sets of orifices can be used. For example, two orifices can be connected to a common individually controllable vacuum chamber to allow orifices to be enabled in pairs, or larger numbers. Also, while the present disclosure has generally described the cylinder 118 as being in contact with the flexible material 160, it will be appreciated that it need not actually touch, so long as the underlying flexible material is in communication with the orifice by being sufficiently close thereto to for the purposes described herein.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. An apparatus to remove a cut piece from a flexible sheet of material, the apparatus comprising:
a pick head including a cylinder having a cylindrical surface that includes a plurality of first orifices arranged in a first row along a length of the cylindrical surface, and a vacuum actuator including a plurality of first vacuum control mechanisms each coupled to provide vacuum to an associated one of the first orifices;
a vacuum controller including a plurality of first signal outputs each coupled to provide a signal to an associated one of the first vacuum control mechanisms to provide the vacuum at the associated first orifices, the vacuum controller configured to selectively enable the vacuum at a portion of the first orifices by providing the signal to a portion of the first vacuum control mechanisms, the portion of the first vacuum control mechanisms being associated with the portion of the first orifices; and a rotation controller coupled to the pick head to move the cylindrical surface over the flexible sheet while a vacuum is maintained at the portion of the first orifices to wrap the cut piece onto the cylindrical surface.

2. The apparatus of claim 1, further comprising:
a separator rail configured to maintain a relative position to the cylinder as the cylinder rotates, the relative position of the separator rail being between a support surface upon which the flexible sheet resides and a portion of the cut piece wrapped onto the cylindrical surface, and between a first peripheral portion of the flexible sheet that is adjacent the cut piece and the cylindrical surface.

3. The apparatus of claim 2, wherein a bottom portion of the separator rail is in contact with a portion of the flexible sheet while that is adjacent the cut piece as the cylinder rotates to wrap the cut piece onto the cylindrical surface.

4. The apparatus of claim 3, wherein the separator rail comprises a leading edge and a trailing edge, the leading edge being closer to a lower most lateral region of the cylinder surface than the trailing edge as the cut piece is wrapped onto the cylindrical surface.

5. The apparatus of claim 4, wherein the leading edge is a cutting edge configured to cut residual portions of the flexible sheet that connects the cut piece to portions peripheral to the cut piece, including the first peripheral portion, as the cut piece is wrapped onto the cylindrical surface.

6. The apparatus of claim 4, wherein the cutting edge comprises a reciprocating edge.

7. The apparatus of claim 2, wherein the separator rail is a roller.

8. The apparatus of claim 1, wherein:
the cylindrical surface further includes a second plurality of first orifices arranged in a second row along the length of the cylindrical surface;
the vacuum actuator further includes a plurality of second vacuum control mechanisms each coupled to provide vacuum to an associated one of the second orifices;
the vacuum controller further includes a plurality of second signal outputs each coupled to provide the signal to an associated one of the second vacuum control mechanisms to provide the vacuum at the associated second orifices;
the vacuum controller is further configured to selectively enable the vacuum at a portion of the second orifices by providing the signal to a portion of the second vacuum control mechanisms, the portion of the second vacuum control mechanisms being associated with the portion of the second orifices; and
the rotation controller is further coupled to the pick head to move the cylindrical surface over the flexible sheet while the vacuum is maintained at the portion of the second orifices.

9. The apparatus of claim 1, further comprising:
a separator rail configured to maintain a relative position to a lower-most lateral edge of the cylinder as the cylinder rotates, the relative position of the separator rail being between a support surface upon which the flexible sheet resides and a portion of the cut piece wrapped onto the cylindrical surface.

10. An apparatus comprising:
a pick head comprising a cylinder and a vacuum control device, the cylinder having a cylindrical surface populated with a plurality of orifices arranged in a row along a length of the cylindrical surface, and the vacuum control device including a plurality of vacuum control mechanisms, each vacuum control mechanism coupled to an associated one of the orifices to provide vacuum to the associated orifices;
a surface to support a flexible sheet of material comprising a cut piece that is surrounded by a first peripheral portion of the flexible sheet;
a position controller coupled to communicate with the pick head, and configured to position the pick head so that a first portion of the plurality of orifices is over a leading edge of the cut piece, and a second portion of the plurality of orifices is over an adjacent portion of the flexible sheet adjacent the cut piece;
a discrete vacuum controller including a plurality of signal outputs each coupled to provide a signal to an associated one of the vacuum control mechanisms to provide the vacuum at the associated orifices, the vacuum controller configured to enable a first portion of the vacuum control mechanisms to provide the vacuum, after the pick head has been placed over the leading edge, at each vacuum chamber having a corresponding orifice that belongs to the to the first portion of orifices, to positively engage the leading edge of the cut piece with the cylindrical surface, and to disable a second portion of the plurality of vacuum control mechanisms to disable the vacuum at each vacuum chamber having a corresponding orifice that belongs to the second portion of orifices to prevent the adjacent portion of the flexible sheet from being engaged with the cylindrical surface; and a rotation controller coupled to the pick head to rotate the cylindrical surface over the sheet of material, after the vacuum is implemented on the first portion of the orifices, to wrap the cut piece onto the cylindrical surface.

\* \* \* \* \*